(12) United States Patent
Lee et al.

(10) Patent No.: US 11,450,044 B2
(45) Date of Patent: Sep. 20, 2022

(54) CREATING AND DISPLAYING MULTI-LAYERED AUGEMENTED REALITY

(71) Applicant: KT CORPORATION, Gyeonggi-do (KR)

(72) Inventors: Zu-Cheul Lee, Gyeonggi-do (KR); Kyung-Kuk Kim, Gyeonggi-do (KR); Yong-Beom Yi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/359,001

(22) Filed: Mar. 20, 2019

(65) Prior Publication Data
US 2020/0302664 A1    Sep. 24, 2020

(51) Int. Cl.
| | | |
|---|---|---|
| *G06T 11/60* | (2006.01) | |
| *G06T 5/00* | (2006.01) | |
| *G06T 5/20* | (2006.01) | |
| *G06T 11/00* | (2006.01) | |
| *G06T 19/00* | (2011.01) | |

(52) U.S. Cl.
CPC .............. *G06T 11/60* (2013.01); *G06T 5/002* (2013.01); *G06T 5/20* (2013.01); *G06T 11/001* (2013.01); *G06T 19/006* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 10,043,233 B1* | 8/2018 | Beri | .......................... G06T 1/20 |
| 2005/0083325 A1* | 4/2005 | Cho | ................... G01C 21/3638 |
| | | | 345/419 |
| 2012/0194706 A1 | 8/2012 | Kwak | |
| 2013/0300728 A1* | 11/2013 | Reichow | ................ G09G 3/003 |
| | | | 345/419 |
| 2016/0065943 A1* | 3/2016 | Yim | ..................... H04N 13/111 |
| | | | 348/46 |
| 2018/0032031 A1* | 2/2018 | Du | .......................... G03H 1/04 |

(Continued)

FOREIGN PATENT DOCUMENTS

| | | |
|---|---|---|
| KR | 10-2012-0017783 A | 2/2012 |
| KR | 10-2012-0086810 A | 8/2012 |

(Continued)

*Primary Examiner* — Todd Buttram
(74) *Attorney, Agent, or Firm* — IP Legal Services, LLC

(57) ABSTRACT

Provided is a method and a device for creating and displaying a multilayer augmented reality image. The device may include a photographing circuit configured to capture images of a real environment and an image processor configured to create an AR content, extract at least one object from the captured images of the real environment, display the captured images of real environment as a first layer, display the created AR content as a second layer and overlay the second layer on the first layer, and display the extracted object as an object image layer and overlay the object image layer on the second layer.

16 Claims, 12 Drawing Sheets

(56) References Cited

U.S. PATENT DOCUMENTS

2018/0288387 A1* 10/2018 Somanath ............ H04N 13/128
2019/0019296 A1*  1/2019 Watanabe ............. H04N 7/183
2019/0113995 A1*  4/2019 Kies ................... G06F 3/03547

FOREIGN PATENT DOCUMENTS

| KR | 10-2012-0137021 A | 12/2012 |
| KR | 10-2015-0021791 A |  3/2015 |
| KR | 10-1684139 B1     | 12/2016 |
| KR | 10-2017-0048781 A |  5/2017 |
| KR | 10-2017-0054146 A |  5/2017 |

* cited by examiner

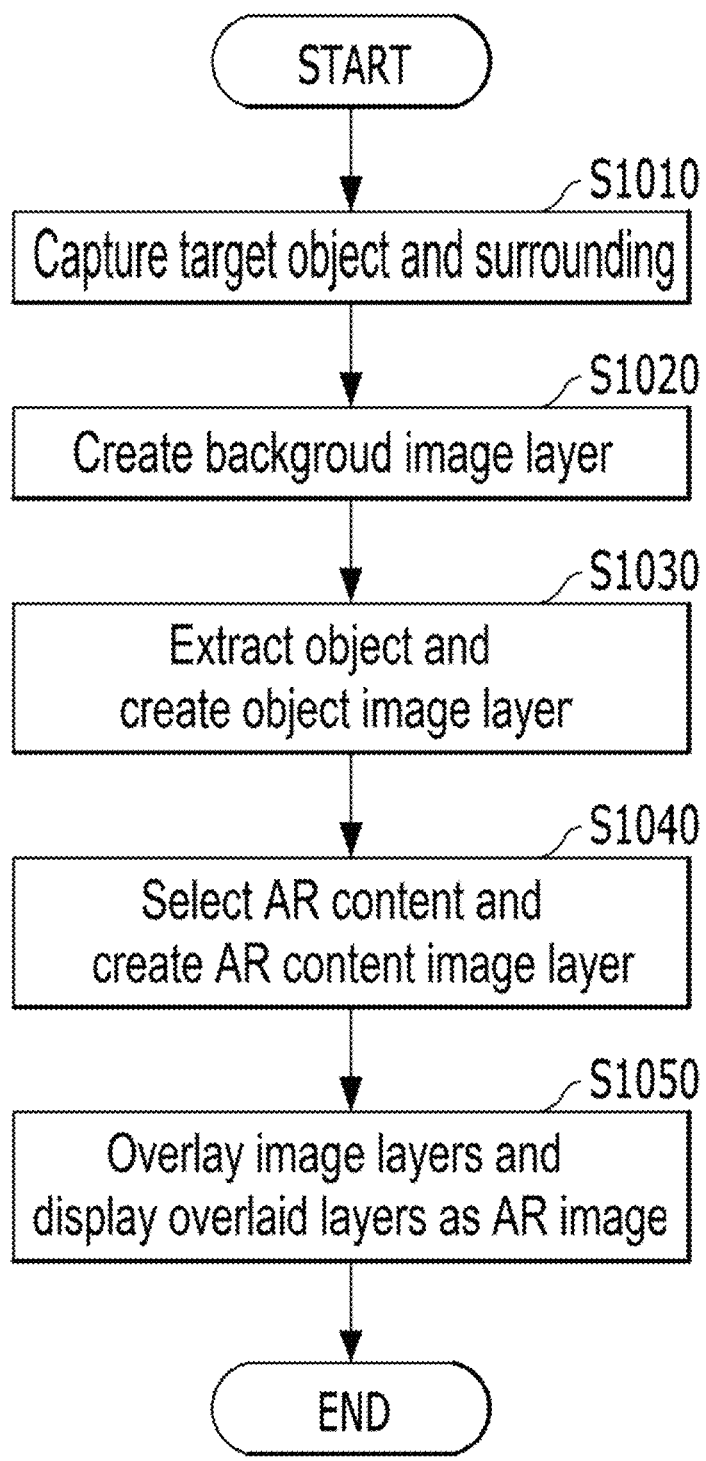

CREATING AND DISPLAYING MULTI-LAYERED AUGEMENTED REALITY

BACKGROUND

The present disclosure relates to augmented reality (AR) and, more particularly, to creating and displaying multi-layered augmented reality in real-time.

Augmented Reality (AR) technology is the technology that expands our physical world, adding layers of digital information onto it. Unlike Virtual Reality (VR), AR does not create the whole artificial environments to replace real with a virtual one.

Typically, augmented reality images (or video streams) are created in two layers of images. For example, a virtually created content is created as a first image layer, a real-world environment image is created as a second image layer, and the first image layer is overlaid on the second image layer. That is, one image layer simply covers the other image layer. Such typical augmented reality images (or videos) have defects, such as low 3D effect, inferior depth of fields, and unrealistic augmented effect. Furthermore, the virtually created content blocks many objects in the real-world environment images.

SUMMARY

In accordance with an aspect of the present embodiment, an augmented reality image (e.g., augmented reality video) may be created in real time with multiple image layers (e.g., multiple video layers) including a background image layer, an AR content image layer, and an object image layer.

In accordance with another aspect of the present embodiment, i) at least one object may be extracted from images of a target object and surroundings while displaying the AR image including a background image and the AR contents image layer, ii) an additional image layer (e.g., an object image layer) may be created with the extracted one object, and the additional image layer may be overlaid on and displayed together with the background image layer and the AR content image layer and displayed.

In accordance with further another aspect of the present embodiment, the background image layer may be processed to be blur after extracting the object from images of the target object and surroundings, and the object image layer is overlaid on the background image layer with a predetermined distance in order to efficiently enhance a 3D effect and depth of filed.

In accordance with still another aspect of the present embodiment, an overlaying order of the background image layer, the AR content image layer, and the object image layer may be dynamically determined in order to enhance an augmented effect according to various conditions for displaying the AR image.

In accordance with yet another aspect of the present embodiment, a 3D object may be overlaid on and overlapped with at least one adjacent image layer in order to improve the 3D effect and depth of filed.

In accordance with further still another aspect of the present embodiment, a part of a 3D object may be covered or hided by at least one of adjacent image layers.

In accordance with further still another aspect of the present embodiment, the multiple image layers of the AR image may be separately displayed on displays.

In accordance with at least one embodiment, an augmented reality (AR) device may be provided for creating and displaying multiple image layers in real time. The AR device may include: a communication circuit configured to communicate with other devices through a communication network; a photographing circuit configured to photograph or captured images of a target object with surroundings in real time; an image processor configured to i) create a background image layer using the captured images of the target object with surroundings, ii) extract the target object from the captured images of the target object with surroundings and create an object image layer with the extracted target object, iii) retrieve at least one content from at least one of a server, the AR device, and a user, and create a third image layer using the retrieved at least one content, and iv) create an augmented reality image using the background image layer, the object image layer, and the third image layer; an Input/output circuit configured to receive user input signals from a user and output the augmented reality image to at least one display.

The image processor may be configured to process the background image layer to be blur; and overlay the object image layer on the blurred background image layer.

The image processor may be configured to use a Gaussian filter to blur the background image layer.

The image processor may be configured to determine an overlaying order of each of the background image layer, the object image layer, and the third image layer; and overlay the background image layer, the object image layer, and the third image layer based on the overlaying order.

The image processor may be configured to determining a distance to/from adjacent image layers; and overlaying the background image layer, the object image layer, and the third image layer to be separate at the determined distance to/from adjacent image layers.

The distanced may be determined based on a size of at least one object in each image layer.

The image processor may be configured to overlay one image layer on the other image layer at a predetermined distance by changing a z value of each image layer where a z value is a depth value of a three dimensional coordinate system.

When a first object in the third image layer is selected, the image processor may be configured to create a first object image layer to show the selected first object to be popped over the third image layer by changing a z value of the first object greater than a z value of the additional image layer.

When a first color in the third image layer is selected, the image processor is configured to create a first color image layer to show an object having the selected first color to be popped over the third image layer by changing a z value of the object having the selected first color greater than a z value of the third image layer.

When a three-dimensional object is retrieved, the image processor is configured to create a three-dimensional object image layer to show parts of the three-dimensional object to be overlaid on, overlapped with, or hided by the object image layer and the background image layer according to z values of the parts of the three dimensional object.

The input/output circuit is configured to output at least one of the background image layer, the object image layer, and the third image layer to a first display, and output the others to a second display. The first display and the second display are a transparent display.

The image processor is configured to select at least one of the background image layer, the object image layer, and the third image layer while displaying the augmented reality image on the at least one display; and interrupt displaying the selected one.

While displaying the augmented reality image including the background image layer, the object image layer, and the third image layer on the at least one display, the image processor is configured to select at least one object in one of the background image layer, the object image layer, and the third image layer, create an additional image layer with the selected at least one object, determine an overlaying order of the additional image layer, determine a distance from/to adjacent image layers, overlay the created additional image layer on one of the background image layer, the object image layer, and the third image layer according to the determined overlaying order, to be separated at the determined distance from/to the adjacent image layers, and continuously display the augmented reality image by rendering the background image layer, the object image layer, the third image layer, and the additional image layer.

While displaying the augmented reality image including the background image layer, the object image layer, and the third image layer on the at least one display, the image processor is configured to retrieve at least one content from at least one of a server, the AR device, and a user, create an additional image layer with the retrieved at least one object, determine an overlaying order of the additional image layer, determine a distance from/to adjacent image layers, overlay the created additional image layer on one of the background image layer, the object image layer, and the third image layer according to the determined overlaying order, to be separated at the determined distance from/to the adjacent image layers; and continuously display the augmented reality image by rendering the background image layer, the object image layer, the third image layer, and the additional image layer.

In accordance with another embodiment, a method may be provided for creating and displaying multiple image layers in real time. The method may include: capturing images of a target object with surroundings in real time; creating a background image layer using the captured images of the target object with surroundings; extracting the target object from the captured images and create an object image layer with the extracted target object; retrieving at least one content from at least one of a server, the AR device, and a user, and create a third image layer using the retrieved at least one content; creating an augmented reality image using the background image layer, the object image layer, and the third image layer; and outputting the augmented reality image to at least one display.

The method may include processing the background image layer to be blur; and overlaying the object image layer on the blurred background image layer.

The method may include determining an overlaying order of each of the background image layer, the object image layer, and the third image layer, overlaying the background image layer, the object image layer, and the third image layer based on the overlaying order, determining a distance to/from adjacent image layers, and overlaying the background image layer, the object image layer, and the third image layer to be separate at the determined distance to/from adjacent image layers.

When a first object in the third image layer is selected, the method may include creating a first object image layer to show the selected first object to be popped over the third image layer by changing a z value of the first object greater than a z value of the additional image layer. When a first color in the third image layer is selected, the method may include creating a first color image layer to show an object having the selected first color to be popped over the third image layer by changing a z value of the object having the selected first color greater than a z value of the third image layer.

While displaying the augmented reality image including the background image layer, the object image layer, and the third image layer on the at least one display, the method may include selecting at least one object in one of the background image layer, the object image layer, and the third image layer, creating an additional image layer with the selected at least one object, determining an overlaying order of the additional image layer, determining a distance from/to adjacent image layers, overlaying the created additional image layer on one of the background image layer, the object image layer, and the third image layer according to the determined overlaying order, to be separated at the determined distance from/to the adjacent image layers, and continuously display the augmented reality image by rendering the background image layer, the object image layer, the third image layer, and the additional image layer.

While displaying the augmented reality image including the background image layer, the object image layer, and the third image layer on the at least one display, the method may include retrieving at least one content from at least one of a server, the AR device, and a user, creating an additional image layer with the retrieved at least one object, determining an overlaying order of the additional image layer, determining a distance from/to adjacent image layers, overlaying the created additional image layer on one of the background image layer, the object image layer, and the third image layer according to the determined overlaying order, to be separated at the determined distance from/to the adjacent image layers, and continuously displaying the augmented reality image by rendering the background image layer, the object image layer, the third image layer, and the additional image layer.

BRIEF DESCRIPTION OF THE DRAWINGS

FIG. 3 is a flowchart illustrating a method for creating and displaying a multilayered augmented reality in accordance with at least one embodiment of the present disclosure.

DETAILED DESCRIPTION OF EMBODIMENTS

In accordance with at least one embodiment, an augmented reality image (e.g., augmented reality video) may be created in real time with multiple image layers (e.g., multiple video layers) including a background image layer, an AR content image layer, and an object image layer. That is, i) at least one high-priority object may be extracted from captured images while displaying the AR image including a background image and the AR contents image layer, ii) an additional image layer (e.g., an object image layer) may be created with the extracted at least one object, and the additional image layer may be overlaid on and displayed together with the background image layer and the AR content image layer and displayed.

That is, an augmented reality image (e.g., augmented reality video) is created in multiple layers of images. For example, at least one target object may be extracted from a real-environment image (e.g., a background image layer), an additional object image layer may be created with the extracted at least one object, and the additional image layer may be overlapped with the real-environment image layer (e.g., background image layer) and an augmented reality contents image layer (e.g., AR content image layer).

Furthermore, the background image layer may be processed to be blur after extracting at least one high priority object therefrom, and in order to efficiently enhance a 3D effect and depth of filed by rendering the blurred background image layer with the object image layer. An overlaying order of the background image layer, the AR content image layer, and the object image layer may be dynamically determined in order to enhance an Augmented effect according to various conditions for displaying the AR image. A 3D object may be overlaid and overlapped with at least one adjacent image layer in order to improve the 3D effect and depth of filed. The multiple image layers of the AR image may be separately displayed on displays in response to a user selection.

Figure 1:
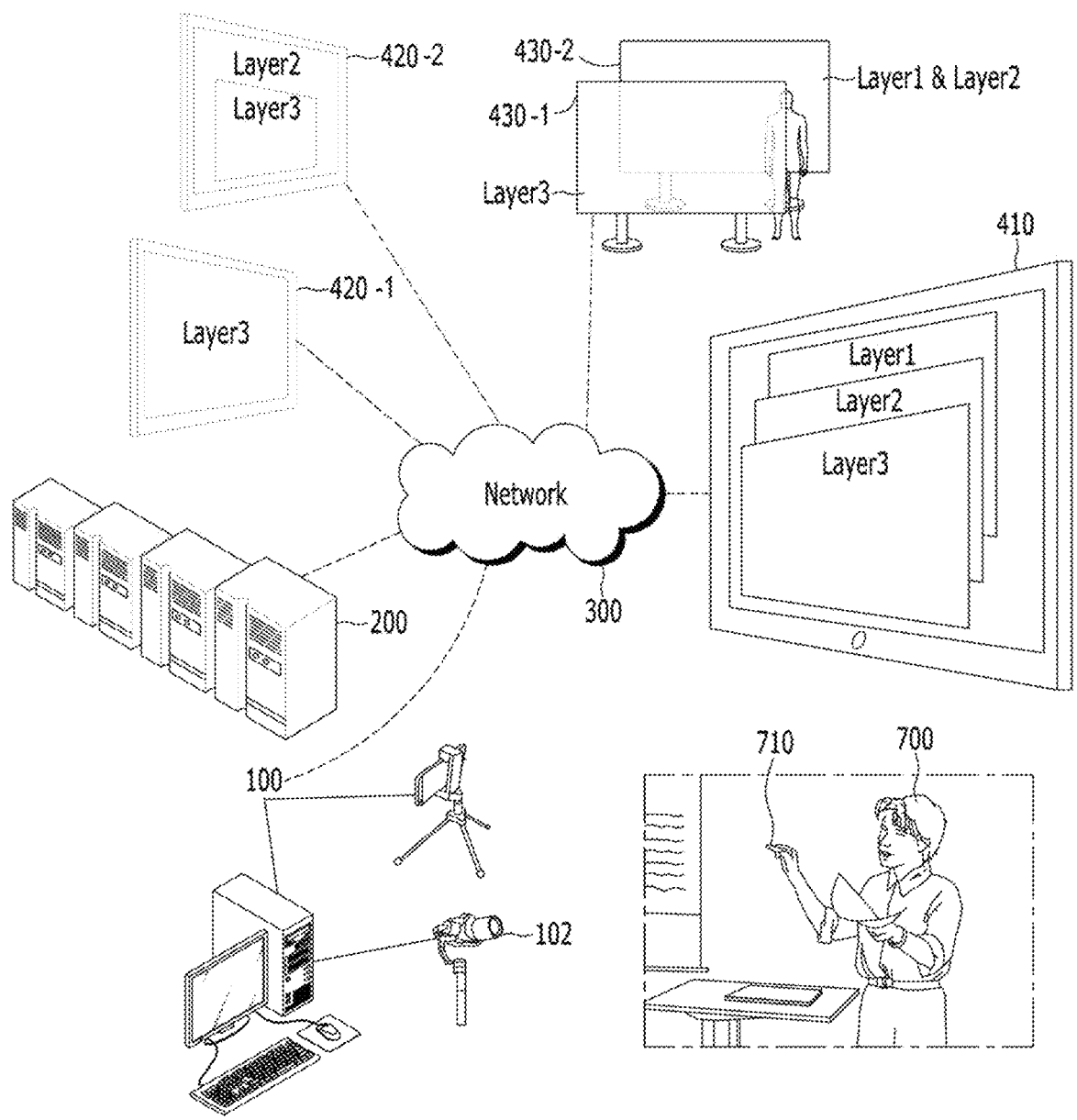
FIG. 1 is a diagram for describing creating a multilayered augmented reality in accordance with at least one embodiment of the present disclosure.

For creating such a multilayered augmented image, an AR user device and a server may be used. Furthermore, such a multilayered AR image may be displayed through at least one display. FIG. 1 is a diagram for describing creating a multilayered augmented reality in accordance with at least one embodiment of the present disclosure.

Referring to FIG. 1, a multilayered augmented reality image (e.g., multilayered AR image or multilayered AR video) may be created using augmented reality (AR) user device 100, server 200, and various displays 410, 420, and 430 in accordance with at least one embodiment. AR user device 100 may be connected with server 200 through network 300 in accordance with at least one embodiment. Network 300 may be a communication network for connecting nodes (or terminals) thought a wired link or a wireless link to communicate each other. Network 300 may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto.

Server 200 may be a storage server or a contents-server that store or provide various AR contents (e.g., images and videos), three dimensional (3D) objects, and user-uploaded contents including a presentation material to subscribers, such as AR user device 100. Server 200 may store a list of previously created various AR contents and provide at least one of AR contents to a subscriber through a predetermined user interface.

In accordance with at least one embodiment, server 200 may be a service server for providing various data to subscribers who register for related services. For example, server 200 may store images, presentation materials, and contents, which are created and uploaded by users or $3^{rd}$ party creators as AR object contents and 3D contents. AR user device 100 may be registered for the services provided by server 200 in accordance with at least one embodiment. Server 200 may provide a graphic user interface to AR user device 100 for accessing to server 200, selecting at least one of contents, retrieving the selected contents, and so forth.

AR user device 100 may be an electron device capable of communicating with other devices through network 300, storing images and streams, capturing images, and generating video streams based on the captured images. For example, AR user device 100 may be dedicated electronic device 101 in accordance with at least one embodiment. However, the embodiments of the present disclosure are not limited thereto. For example, AR user device 100 may include a laptop computer equipping camera 102, a desktop personal computer equipping camera 102 and a mobile device 101 equipping camera 102. Such a mobile device may include a smart phone, a tablet PC, a wearable device, any portable devices equipping a camera and communication modules of Bluetooth (BLE: Bluetooth low energy), NFC, RFID, Ultrasonic, infrared, WiFi, LiFi, and so forth. Furthermore, the mobile device may include an artificial intelligent (AR) device, such as the amazon echo show®, the giga Genie®, or the Google home®.

In accordance with at least one embodiment, AR user device 100 may be installed with a predetermined application (e.g., software program or APP) for enabling a user to capture images, creating an AR video stream. AR user device 100 may provide a dedicated user interface to interactive with server 200 and remote controller 710. Furthermore, user device 100 may provide another dedicated user interface for creating a multilayered AR video in response to user input received from remote controller 710.

AR user device 100 may photograph or capture images of a real environment or a real space with various objects therein. For example, AR user device 100 may be internally or externally connected to camera 102 and photograph or capture images of a target real environment with at least one object located therein. As shown in FIG. 1, AR user device 100 may capture images of user 700 holding remote controller 710. Such an image of user 700 may be displayed with AR contents through various displays 410, 420 and 430.

In accordance with at least one embodiment, AR user device 100 may generate AR contents and create an AR content image layer. For example, the AR contents may include character images and presentation materials or retrieve necessary contents from server 200, create an AR content image layer, overlay the created AR content image layer on the background image layer, and display such multiple images simultaneously as AR image.

AR user device 100 may extract at least one object from the captured images. For example, AR user device 100 may extract at least one object included in the captured images using a background subtraction algorithm such as HVR or an alpha map. Such at least one object may be a person 700.

AR user device 100 may create a background image layer with the captured images of the real environment as a first image layer (e.g., Layer 1), overlay an AR content mage layer received from server 200 on the first image layer, and display the overlapping result. Furthermore, AR user device 100 may create an object image layer (e.g., layer 3) with the extracted at least one object, overlap the object image layer on at least one of the first image layer (layer 1) and the second image layer (e.g., layer 2) or between the first image layer and the second image layer. For example, AR user device 100 may make the first image layer blur and overlap the object image layer on the blurred first image layer in order to improve a 3D effect and depth of filed in real time.

In addition, AR user device 100 may generate a 3D object or retrieve a 3D object from server 200, generate a 3D object image layer, arrange the 3D object image layer among the background image layer, the object image layer, and the AR content image layer, overlay and display the 3D object image layer to have the 3D object to be overlapped with at least one on the background image layer, the object image layer, and the AR content image layer.

In particular, AR user device 100 may dynamically display a 3D object through a third image layer according to movement of the 3D object, based on at least one coordinate value of the moving 3D object and coordinate values of the multiple layers. When the at least one coordinate value of the moving object exceeds the coordinate values of the first and second image layers, AR user device 100 may display the moving 3D object to be overlapped with or hided by one of the first and second image layers.

In accordance with at least one embodiment, the created AR image may be displayed on at least one of displays 410, 420, and 430. For example, the created AR image includes more than three image layers, such as the background image layer (e.g., Layer 1), the object image layer (e.g., Layer 2), and the AR content image layer (e.g., Layer 3). All image layers of the AR image may be displayed on one display 410. Alternatively, each image layer of the AR image may be separately displayed on different displays 410, 420, and 430. For example, the AR content image layer (e.g., Layer 3) may be displayed on display 420-1 and the other image layers (e.g., Layer 2 and Layer 1) may be displayed on display 420-2.

Furthermore, such an AR image may be separately displayed on transparent displays 430-1 and 430-2 in order to improve the 3D effect and depth of filed and the Augmented effect. For example, the AR content image layer (e.g., Layer 3) may be displayed on transparent display 430-1 and the other image layers (e.g., Layer 2 and Layer 1) may be displayed on transparent display 430-2. The person 700 may be stand in between transparent displays 430-1 and 430-2 for effectively giving or explaining a presentation produced as the AR image.

As described, AR user device 100 may create an augmented reality image (e.g., augmented reality video) may be created in real time with multiple image layers (e.g., multiple video layers) including a background image layer, an AR content image layer, and an object image layer. Furthermore, AR user device 100 may process the background image layer to be blur after extracting at least one high priority object therefrom and render the blurred background image layer with the object image layer in order to efficiently enhance a 3D effect and depth of filed of the AR image. In addition, AR user device 100 may dynamically determine and control an overlaying order of the background image layer, the AR content image layer, and the object image layer according to various conditions for displaying the AR image in order to enhance an Augmented effect. AR user device 100 may create, overlay, and overlap a 3D object with at least one adjacent image layer in order to improve the 3D effect and depth of filed. AR user device 100 may display the multiple image layers of the AR image separately on various displays 410, 420, and 430.

Figure 2:
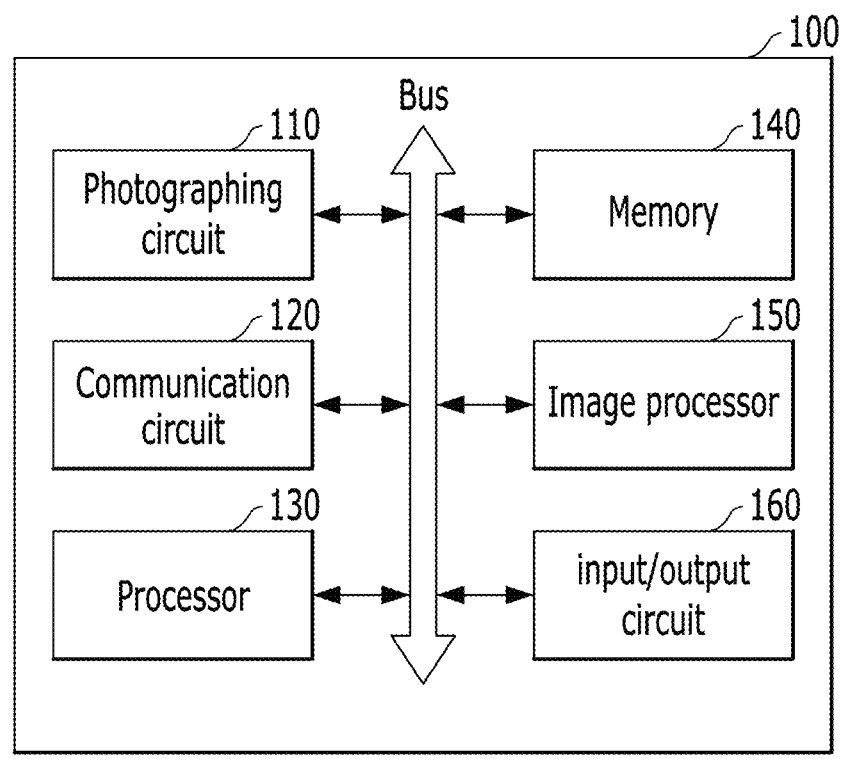
FIG. 2 is a block diagram illustrating an apparatus for creating a multilayered augmented reality in accordance with at least one embodiment of the present disclosure.

Hereinafter, functions and features of each constituent elements of AR user device 100 will be described with reference to FIG. 2. FIG. 2 is a diagram illustrating an AR user device in accordance with at least one embodiment.

Referring to FIG. 2, AR user device 100 may include photographing circuit 110, communication circuit 120, processor 130, memory 140, image processor 150, and input/output circuit 160.

Photographing circuit 110 may capture images of or photograph a real-environment or a real space. For example, photographing circuit 110 may photograph or capture images of an indoor and outdoor of a target place. As shown in FIG. 1, using photographing circuit 100, user 700 may be captured with surrounding environments.

Communication circuit 120 may communicate with other entities including server 200 through network 300. Communication circuit 120 may include at least one module (or at least one circuit) for communicating with other entities through a communication network. Herein, the communication network may include a variety of communication networks such as a wireless communication network and a wired communication network. Communication circuit 120 may include at least one of a wireless communication circuit and a wired communication circuit. Herein, the wireless communication circuit and wired communication may be separately or integrally configured.

In particular, communication circuit 120 may perform communication through a RF signal. Communication circuit 120 may convert a RF signal to a digital signal (e.g., electric signal) or a digital signal to a RF signal and transmit the converted signal through a communication network. Communication circuit 110 may include an antenna system, a RF transceiver, at least one of amplifiers, a tuner, at least one of oscillators, a digital signal processor, a CODEC chipset, a subscriber identity module (SIM) card, and a dedicated memory.

Memory 140 may store a variety of information, such as software programs for operation, data received from other entities, and data generated as result of operations. That is, memory 140 may store an operation system data, applications, and related data, received from other entities through a variety of communication media (e.g., communication networks). Memory 140 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Processor 130 may perform or control overall operation of AR user device 100. For example, processor 130 may be a central processing circuitry that controls constituent elements (e.g., memory, communication circuit, etc.) of AR user device 100 and/or performs a variety of operations (or functions) of AR user device 100. Processor 130 may perform operations for creating multi-layered augmented reality in cooperation with image processor 150.

Image processor 150 may mainly perform operations for creating an AR image. For example, image processor 150 may create a predetermined AR content using contents stored in server 200. Image processor 150 may extract at least one of objects in the photographed real environment or the captured images of the real environment. In particular, image processor 150 may use a hyper virtual reality as a TV augmented reality convergence technology using a background subtraction algorithm in order to extract a target object. The target object may be a person. Furthermore, image processor 150 may create a 3D object using contents stored in server 200.

In accordance with at least one embodiment, image processor 150 may determine an overlaying order of the multiple image layers based on a user input.

Input/output circuit 160 may display the photographed real environment as a first layer and display the created AR contents as the second layer to be overlapped on the first layer. Input/output circuit 160 may display the extracted object as an object image layer to be overlapped on the second layer. For example, input/output circuit 160 may blur the first layer, overlay the object image layer on the blur first layer and the second layer.

Input/output circuit 160 may overlay the 3D object as the object image layer on the second layer if image processor 150 creates the 3D object. Such a plurality of layers are arranged to be parallel along one axis based on a predetermined coordinate value and overlaid according to the determined overlaying order. For example, input/output circuit 160 may display the 3D object through the third layer based on coordinate values of the multiple layers and a coordinate value of at least one region of a 3D object when the 3D object moves. When the coordinate value of the at least one region exceeds coordinate values of the first layer or the second layer, at least one region may be displayed to be blocked by the first layer or the third layer.

As described, AR user device 100 may produce an augmented reality image (e.g., augmented reality video) with multiple image layers (e.g., multiple video layers) including a background image layer, an AR content image layer, and an object image layer. While displaying an AR image on predetermined display 410, AR user device 100 may perform, in real time, the image processing operations of extracting i) at least one object from captured images while displaying the AR image including a background image and the AR contents image layer, ii) creating an additional image layer (e.g., an object image layer) with the extracted one object, and iii) overlaying the additional image layer on and display together with the background image layer and the AR content image layer. In accordance with the embodiment, AR user device 100 may process the background image layer to be blur after extracting the object therefrom and overlay the object image layer on the background image layer with a predetermined distance. Accordingly, AR user device 100 may significantly and efficiently enhance the 3D effect, the immersive effect, and the depth of field effect in real-time image processing.

Furthermore, AR user device 100 may determine, change, and control an overlaying order of the background image layer, the AR content image layer, and the object image layer dynamically according to various predetermined conditions in order to enhance an augmented effect according to various conditions for displaying the AR image. In addition, AR user device 200 may turn on or off one of the displayed image layers. AR user device 200 may overlay the 3D object on and overlap the 3D object with at least one adjacent image layer in order to improve the 3D effect, the immersive effect, and the depth of field effect. That is, a part of a 3D object may be covered or hided by at least one of adjacent image layers. Moreover, AR user device 100 may separately display multiple image layers of the AR image through different displays including transparent displays.

Hereinafter, such operations of AR user device 100 will be described with reference to FIG. 3 with FIG. 1, FIG. 4A to FIG. 4D and FIG. 5A to FIG. 5C. However, the embodiments are not limited thereto. FIG. 3 is a flowchart for illustrating a method for creating and displaying a multilayer augmented reality image in accordance with at least one embodiment.

Referring to FIG. 3, images of a target object and surroundings may be photographed or captured at step S1010. For example, a user (e.g., presenter 700 in FIG. 1) may initiate AR user device 100 to create a multilayer AR image (e.g., using remote controller 710 in FIG. 1) or control AR user device 100 to create another multilayer AR image while displaying a previously produced multilayer AR image on display 410. That is, when AR user device 100 receives an initiation signal or a control signal from the user, AR user device 100 initiates the AR image creating operation and start photographing or capturing images of a target object with surrounding according to a predetermined set. The target object to photograph may be controlled by the user using a remote controller (e.g., 710 in FIG. 1) through a dedicated graphic user interface installed in AR user device 100, executed and displayed on display 410. That is, in response to the initial signal, AR user device 200 may execute a dedicated application or software program, produce a dedicated graphic user interface, and display the graphic user interface on display 410 for interacting with the user.

Figure 4D:
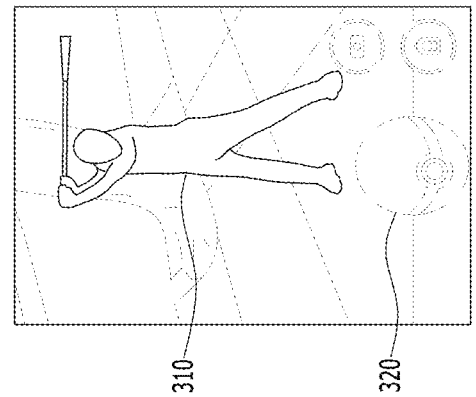
FIG. 4A to FIG. 4D are diagrams for describing a process for generating a background image layer by photographing or capturing images of a target object with surroundings and creating an object image layer by extracting a target object from the captured images, blurring the background image layer, and overlaying the object image layer on the background image layer in accordance with at least one embodiment of the present disclosure.
Figure 4C:
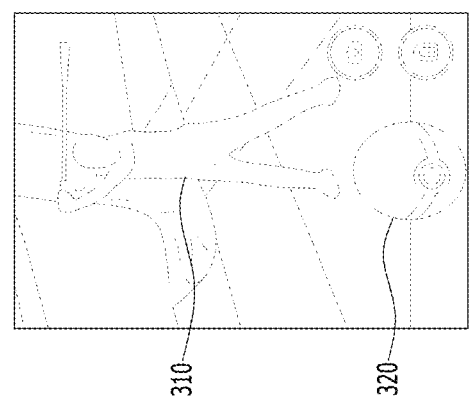
Figure 4B:
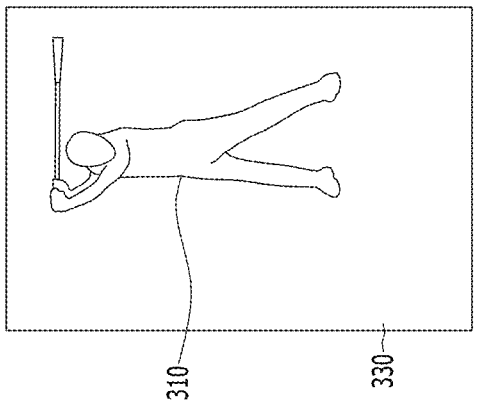
Figure 4A:
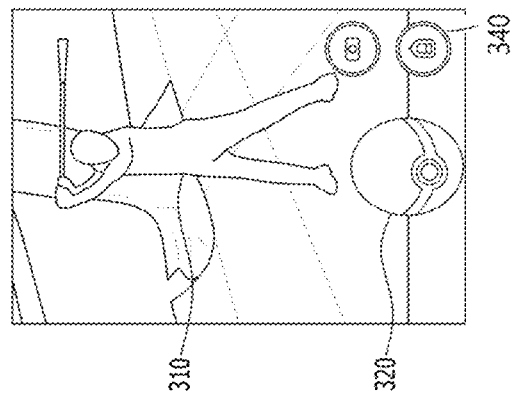

At step S1020, a background image layer may be created. For example, AR user device 200 generates a background image layer with the photographed images of the target object with surroundings and displays the photographed live image of the target object on display 410. While displaying the photographed live image, the dedicated graphic user interface may be displayed simultaneously on display 410. For example, FIG. 4A to FIG. 4D are diagrams for describing a process for generating a background image layer by photographing or capturing images of a target object with surroundings and creating an object image layer by extracting a target object from the captured images, blurring the background image layer, and overlaying the object image layer on the background image layer in accordance with at least one embodiment of the present disclosure. In particular, FIG. 4A shows a background image layer generated or captured images of target object with surroundings by photographing a target object (person 310) with surroundings, such as trees and street. Such a generated background image layer or the captured images may be displayed with the dedicated graphic user interface 340 for interacting with the user.

At step S1030, at least one object may be extracted, and an object image layer may be created with the extracted at least one object. For example, AR user device 200 may receive a selection signal from the user through a remote controller and/or graphic user interface 340 and select at least one object (e.g., person 310) in the background image or the captured images based on the selection signal. AR user device 100 extracts the selected object (e.g., person 310) in real time from the captured image which is a live image of the target object. Such operation may be performed using a background subtraction algorithm, such as high dynamic range (HDR).

Then, AR user device 100 creates an object image layer with the extracted target object and processes the object image layer to be transparent except the target object 310. For example, FIG. 4B shows the object image layer created with the extracted target object (e.g., person 310). As shown in FIG. 4B, the object image layer includes the target object 310 and the transparent background 330.

After creating the object image layer, AR user device 100 processes the background image layer to be blur in accordance with at least one embodiment. For example, the blurring operation is performed. Such a blurring operation may use a 28×28 Gaussian filter, but not limited thereto. FIG. 4C shows the background image layer blurred by AR user device 100 in accordance with at least one embodiment.

After blurring, AR user device 100 may overlay the object image layer on the background image layer with a predetermined distance from the background image layer. Such a distance may be determined based on a predetermined distance value or dynamically according various factors, such as a size of the extracted target object. In particular, the distance is a x value of a z-axis in a three dimensional coordinate system. Here, an x-axis denotes a vertical axis, an y-axis denotes a horizontal axis, and a z-axis denotes a depth axis. That is, such a z value of each image layer may be determined differently based on predetermined factors and parameters in each image layer. For example, a z value of the background image layer may be determined as 100, and a z value of the object image layer may be determined as 110.

In accordance with at least one embodiment, AR user device 100 overlays the object image layer on the background layer with the determined distance. For example, FIG. 4D shows the object image layer overlaid on the blurred background image layer in accordance with at least one embodiment. As shown in FIG. 4D, by overlaying the object image layers on the blurred background image layer, AR user device 100 may improve the image quality, the 3D effect, the immersive effect, and the depth of field effect. Typically, when a moving object is extracted from a live image without using a blue screen, many errors and distortions are generated. It is difficult to get a sharp image of the target object. In the embodiment of the present disclosure, the extracted target object image is overlaid on the blurred background image. Accordingly, even if the extracted target object image is not sharp, the image quality and the visual quality of the extracted target object image are enhanced by the background image layer located behind of the object image layer. Furthermore, because of the determined distance between the object image layer and the background image layer, the immersive effect and the 3D effect of the resultant image are significantly improved.

At step S1040, at least one AR content may be selected and retrieved from server 200, and an AR content image layer may be created. For example, AR user device 100 may receive a selection signal from the user through a remote controller and/or graphic user interface 340 and select at least one AR content from server 200 based on the selection signal. The at least one AR content may include a 3D object, a presentation material, a virtually created object, and so forth. Server 200 may provide a list of contents to AR user device 100. AR user device 100 may display the provided list of contents on display 410 through the graphic user interface. Alternatively, such a list of contents may be stored in AR user device 100. Based on the selection signal, AR user device 100 retrieves the AR content from server 200 and creates an AR content image layer with the retrieved AR content.

After creating the AR content image layer, AR user device 100 determine an overlaying order and a distance to adjacent image layers. For example, AR user device 100 may receive a user input for determining the overlaying order and the distance to the adjacent image layers. Alternatively, the overlaying order may be determined according to an order of creating image layers, and the distance to the adjacent image layers may be determined according to various factors and parameters of objects, such as a size of objects in image layers.

As described, the distance is a z value of a z-axis in a three dimensional coordinate system. That is, the distance to the adjacent image layers is controlled by determining the z value of the AR content image layer.

Figure 5A:
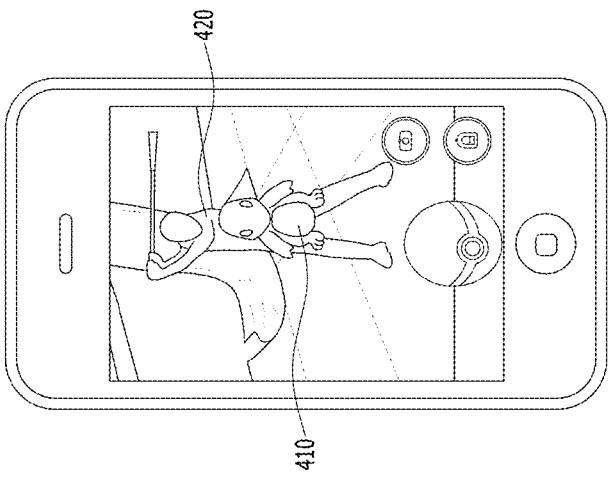
FIG. 5A to FIG. 5C are diagrams illustrating a typical AR image produced by a typical method and a multiplayer AR image produced according to at least one embodiment of the present disclosure.
Figure 5B:
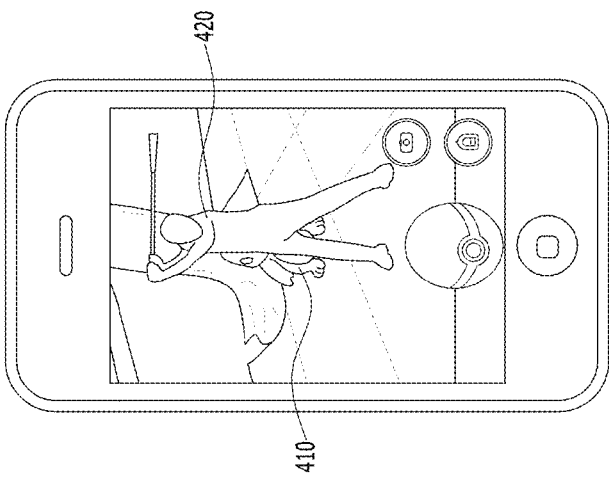
Figure 5C:
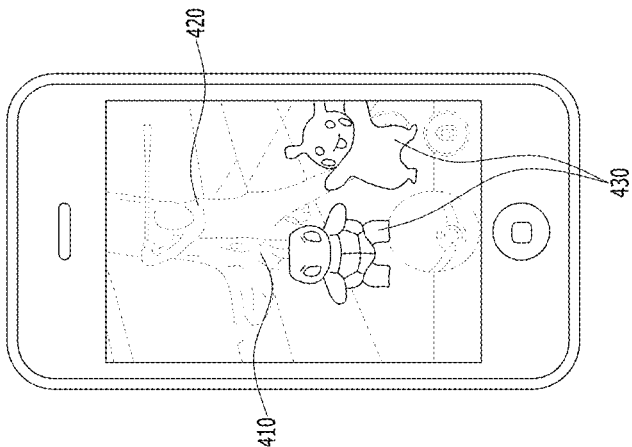

At step S1050, an AR image may be displayed using the background image layer, the object image layer, and the AR content image layer. For example, AR user device 100 i) overlays the AR content image layer on the object image layer and the background layer according to the overlaying order determined based on the user input, ii) overlays the AR content image layer separated the determined distance from the object image layer, and iii) displays the resultant image as the AR image. For example, FIG. 5C shows the multilayer AR image including the background image layer 420, the object image layer 410, and the AR content image layer. As shown, the multilayer AR image has significantly improved 3D effect and immersive effect because of the distance between image layers, the blurred background image layer, and the extracted object image, as compared to a typical two-layer AR image. For example, FIG. 5A to FIG. 5C are diagrams illustrating a typical AR image produced by a typical method and a multilayer AR image produced according to at least one embodiment of the present disclosure. In particular, FIG. 5A shows a typical AR image produced by a typical method. As shown in FIG. 5A, a typical AR image is produced by simply overlaying a second image layer with a virtual character 410 on a first image layer with a person 420 without any distance between two layers. As shown, the virtual character 410 in the second image layer covers the person 420 in the first image layer. Since the overlaying order is not controlled, it is impossible to show the person 420 in front of the virtual character 410.

In accordance with at least one embodiment, the overlaying order of each image layer may be controlled in response to a user input. For example, FIG. 5B shows the first image layer with the person 420 overlaid on the second image layer with the virtual character 410 in accordance with at least one embodiment. As described, AR user device 100 may control the overlaying orders of the first image layer and the second image layer in accordance with at least one embodiment. Accordingly, when a user wants to overlay the person 420 of the first image layer on the virtual character 410 of the second image layer, AR user device 100 controls the overlaying order of the first image layer and the second image layer, as shown in FIG. 5B.

Furthermore, FIG. 5C shows the multilayer AR image including the background image layer 420, the object image layer 410, and the AR content image layer. As shown, the background image layer 420 is blurred, the object image layer 410 is overlaid on the blurred background image layer 420 at a predetermined distance from the blurred background image layer 420. Accordingly, the extracted object 420 is shown with improved 3D effect and immersive effect. In addition, the AR content layer 430 is also overlaid on the object image layer 420 according to the overlaying order of the AR content layer 430 and overlaid with the predetermined distance from the object image layer 420. Therefore, the AR contents 430 are shown with improved 3D effect and immersive effect in accordance with at least one embodiment.

As described, AR user device 100 may overlay one image layer over the other image layer with a distance between two image layers in accordance with at least one embodiment. Such a overlaying method significantly improve the 3D effect and the depth of field effect without requiring high processing power and lengthy processing time, which is essential for processing a live image to produce augmented reality.

Figure 6B:
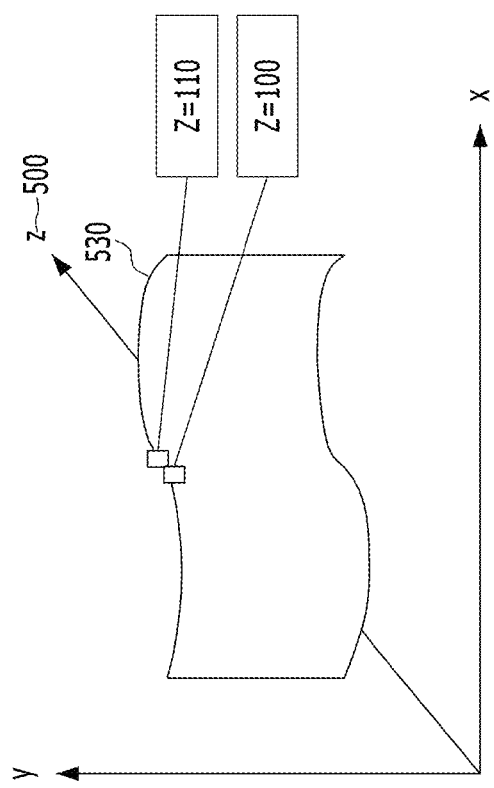
FIG. 6A and FIG. 6B are diagrams for describing an overlaying method for displaying a plurality of image layers in accordance with at least one embodiment of the present disclosure.
Figure 6A:
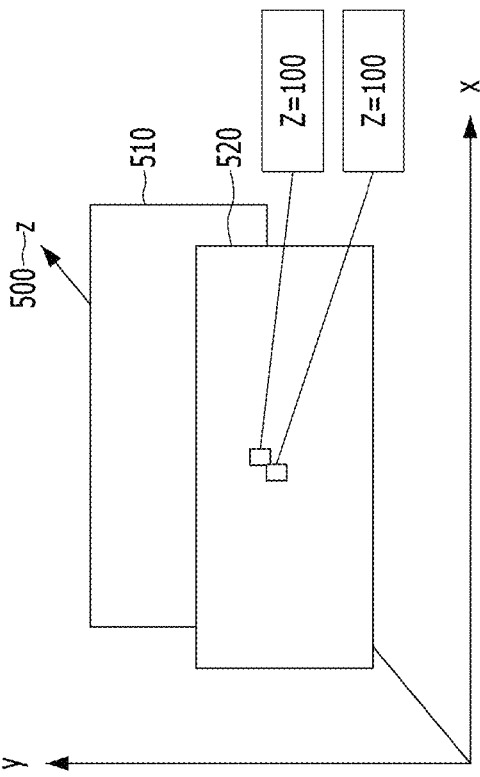

FIG. 6A and FIG. 6B are diagrams for describing an overlaying method for displaying a plurality of image layers in accordance with at least one embodiment of the present disclosure. In particular, FIG. 6A shows a typical overlay method for creating a typical AR image. The typical AR image is created by overlaying two dimensional plans at the same depth point. As shown in FIG. 6A, two independent image layers (e.g., first image layer 510 and second image layer 520) are displayed at the fixed point, such as a z value 100 of a z axis 500. Accordingly, Objects in the first image layer 510 and objects in the second image layer 520 are shown in the same two dimensional plan although objects in the second image layer 520 are located before the objects in the first image layer 510. As a result, the 3D effect and the depth of field effect are deteriorated.

FIG. 6B shows an overlay method for overlaying two image layers with a predetermined distance according to an embodiment of the present disclosure. As described, two image layers are overlaid at a predetermined distance according to an embodiment. That is, z values of two image layers are different, such as a z value of one image layer is 100 and a z value of the other image layer is 110. Accordingly, objects in one image layer are shown before objects in the other image layer when one image layer is overlaid above the other image layer at the predetermined distance. Accordingly, the 3D effect and the depth of field effect of the multilayer AR image can be maximized in accordance with at least one embodiment.

Figure 7A:
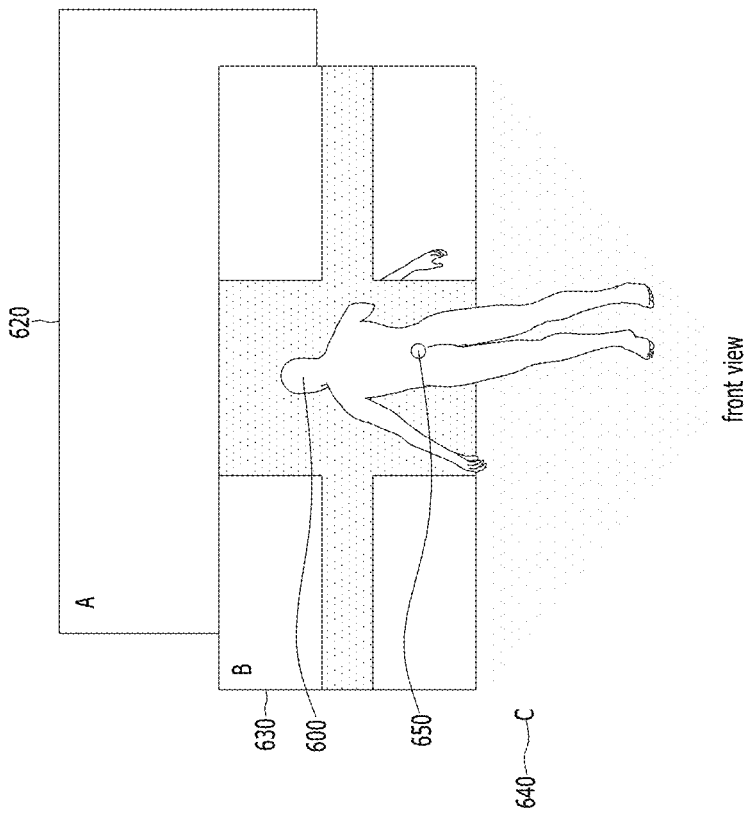
FIG. 7A and FIG. 7B are diagrams for describing displaying a 3D object in a multilayer AR image based on an overlay method in accordance with at least one embodiment.
Figure 7B:
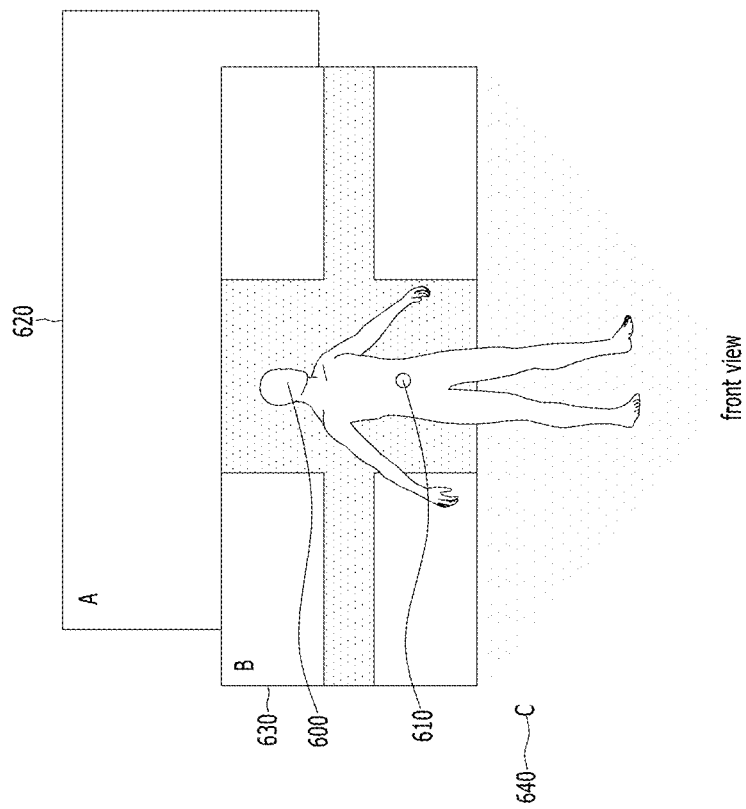

In accordance with at least one embodiment, AR user device 100 may retrieve a 3D object from server 200 in response to a user input, create a 3D object image layer as an additional image layer, determine an overlaying order and a distance to adjacent image layers, and overlay the 3D object image layer on the other image layers. In this case, AR user device 100 may overlay at least one part of the 3D object to be covered by or overlapped with the adjacent image layer in order to maximize the depth of field effect and the 3D effect in accordance with at least one embodiment. Hereinafter, creating and overlaying a 3D object image layer in a multilayer AR image in accordance with at least one embodiment will be described with reference to FIG. 7A and FIG. B. FIG. 7A and FIG. 7B are diagrams for describing displaying a 3D object in a multilayer AR image based on an overlay method in accordance with at least one embodiment.

Referring to FIG. 7A and FIG. 7B, three image layers A 620, B 630, and C 640 may be overlaid and displayed. The image layer A 620 may be created as a 2D background image layer and arranged at a z value 300 of a z axis. The image layer B 630 may be created as a 2D object image layer. The image layer B 630 includes an object area (e.g., botted region, which is an extracted object from the captured images) and a remaining area processed to be transparent. The image layer B 630 is arranged at a z value 200 of the z axis and overlaid on the image layer A 620 with a distance of 100 in a z value.

In accordance with at least one embodiment, a 3D object image layer may be created and overlaid in the multilayer AR image. As shown in FIG. 7A, the image layer C 640 may be created as a 3D object image layer which includes a 3D object 610. For example, such a 3D object is a wireframe type 3D object, but not limited thereto. As shown, the 3D object is a 3D model of a person. Such an image layer C 640 may be arranged at z=100 and overlaid on the image layer B 630 with a 100 z value distanced from the image layer B 630.

As shown in FIG. 7A, 3D object 600 of the image layer C 640 is arranged before the image layer B 630. That is, each z value of the 3D object is smaller than the z value of the image layer B 630. For example, a nose of the 3D object is 80, an ankle of the 3D object is 120, which are smaller than 200 (e.g., the z value of the image layer B 630). That is, the entire 3D object is displayed at the topmost layer.

FIG. 7B shows displaying a 3D object in the multiple layer AR image in accordance with at least one embodiment. When the 3D object moves into and out from the image layer B 630, the 3D object may be displayed to be overlapped, penetrated through, or covered by the image layer B 630 in accordance with at least one embodiment. For example, when the 3D object rotates in a clockwise direction, a right arm is partially shown before the object image layer 630, partially hided by the dotted region, and partially shown through the transparent area of the object image layer 630 (e.g., between 200 to 300). That is, the upper right arm of the 3D object 600 is shown before the object image layer, the middle part is covered by the dotted region of the image layer B 630, and a hand is shown through the image layer B 630 and before the image layer A 620. Therefore, a 3D effect and depth of field effect may be significantly improved in accordance with at least one embodiment.

In accordance with at least one embodiment, a presentation material may be selected in response to a user input, retrieved from at least one of server 200 and AR user device 100, created as a presentation image layer, and overlaid on other image layers at a predetermined distance from an adjacent image layer, as well as the 3D image layer, and the AR content image layer. Furthermore, in order to improve the 3D effect and the immersive effect, one of presentation objects from the presentation image layer may be extracted, the presentation object image layer may be created and overlaid on the presentation image layer at a predetermined distance from the presentation image layer in accordance with at least one embodiment. Such a real-time rendering method for transforming a 2D AR content to a 3D AR content may be performed based on an object color (RGB color) or an object location in accordance with at least one embodiment.

Figure 8A:
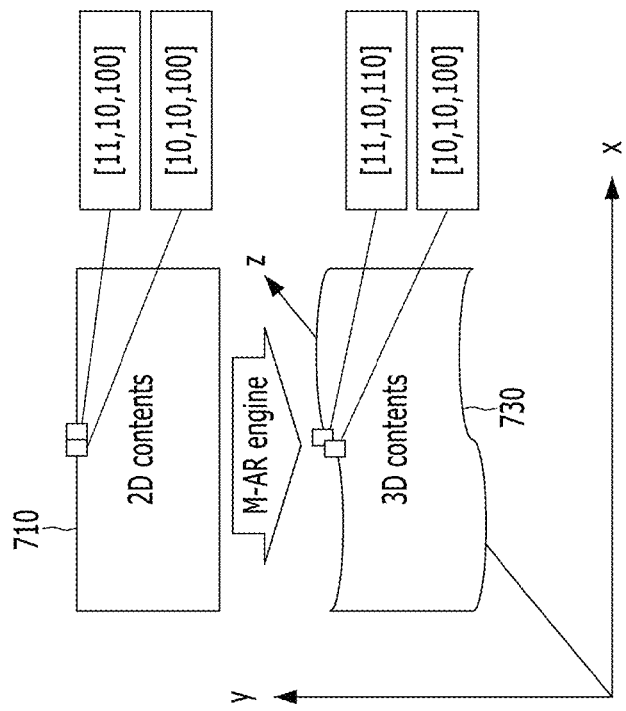
FIG. 8A and FIG. 8B are diagrams for describing a rendering process for converting a 2D image layer to a 3D image layer in order to improve the depth of field effect in accordance with at least one embodiment.
Figure 8B:
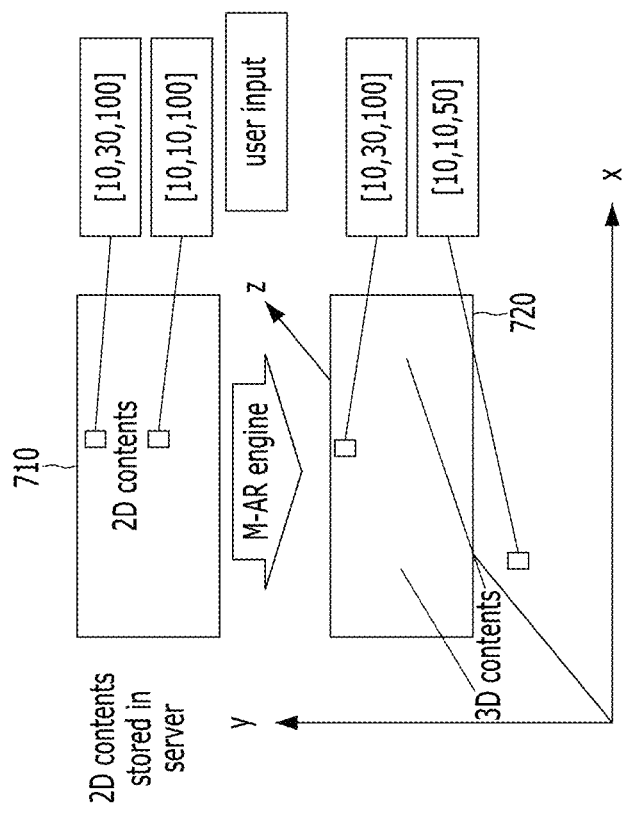

FIG. 8A and FIG. 8B are diagrams for describing a rendering process for converting a 2D image layer to a 3D image layer in order to improve the depth of field effect in accordance with at least one embodiment. In particular, FIG. 8A shows a RGB color based real time depth change in accordance with at least one embodiment. Such a method may be used for any image layer. Referring to FIG. 8A, a depth is changed in real time according to a color value selected by a user in accordance with at least one embodiment. For example, the presentation image layer 710 is a 2D image layer. Two objects in the presentation image layer 710 is arranged at a z value of 100 in the z axis. In this case, the presentation image layer 710 may have a block object having a 3D coordinate system value of [10, 30, 100] and a red object having a 3D coordinate system value of [10, 10, 100], where the 3D coordinate system value is [x value denoting a horizontal position, y value denoting a vertical position, and z value denoting a depth point]. When a user selects the red object to be popped up, AR user device 100 may change a z value of the red object, from [10, 10, 100] to [10, 10, 50], to create a presentation object image layer of the red object and to overlay the presentation object image layer of the red object on the presentation image layer. The red object may be shown to be popped up above on the other image layers.

FIG. 8B shows a location based real time depth change in accordance with at least one embodiment. Such a method may be used for any image layer by changing a location of an object. Referring to FIG. 8B, a depth value (e.g., z value) of an object is changed in real time according to the object selected by a user in accordance with at least one embodiment. For example, the presentation image layer 710 is a 2D image layer. Two objects in the presentation image layer 710 is arranged at a z value of 100 in the z axis. In this case, the presentation image layer 710 may have a first object having a 3D coordinate system value of [11, 10, 100] and a second object having a 3D coordinate system value of [10, 10, 100], where the 3D coordinate system value is [x value denoting a horizontal position, y value denoting a vertical position, and z value denoting a depth point]. When a user selects the first object to be front of the other objects, AR user device 100 may change a z value of the first object from [11, 10, 100] to [11, 10, 110] to be slightly popped up above on the other objects in order to enhance the 3D effect or the depth of field effect.

Figure 9:
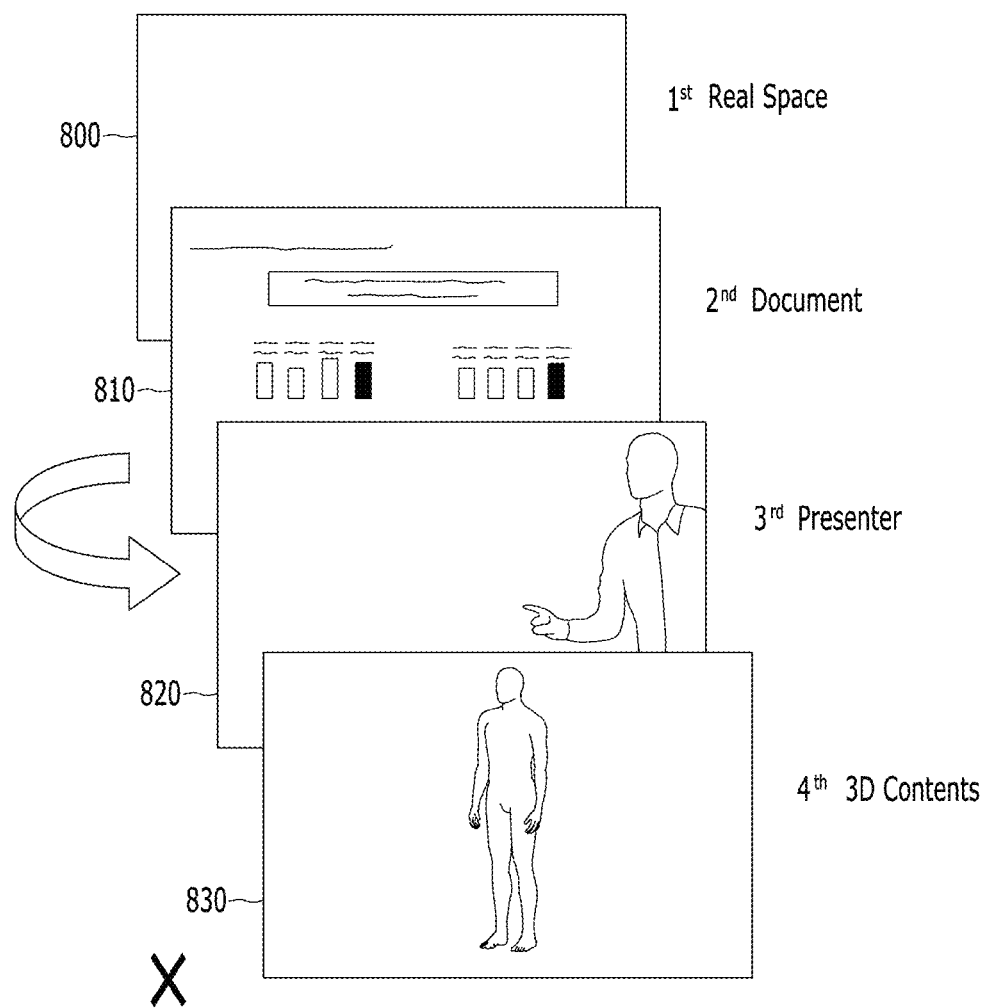
FIG. 9 is a diagram illustrating a method for creating a multilayer augmented reality with a presentation material in accordance with at least one embodiment.

FIG. 9 is a diagram illustrating a method for creating a multilayer augmented reality with a presentation material in accordance with at least one embodiment. Referring to FIG. 9, a user may select at least one AR content and a 3D content from sever 200, photograph or capture images of a presenter and surroundings, and create an AR presentation material using the selected AR content and 3D content.

For example, a presenter and surroundings may be displayed through a background image layer 800, and a presentation material may be created and displayed as a presentation material image layer 810. The presentation material image layer 810 is displayed on the background image layer 800. An object (e.g., presenter) is extracted from the captured images, and an object image layer 820 is created using the extracted object. The object image layer 820 may be overlaid on the presentation material image layer 810. A 3D object image layer 830 may be created with the 3D object and displayed on the object image layer 820. In order to improve the augmented effect, an order of overlaying the image layers may be dynamically determined, and a distance between two adjacent layers may be dynamically controlled in accordance with at least one embodiment. Furthermore, AR user device 100 may turn on or off of each image layer for further improving the augmented effect. In addition, each image layer may be displayed on different displays including transparent displays 430 in order to improve the augmented effect of the multilayer AR image.

Figure 10:
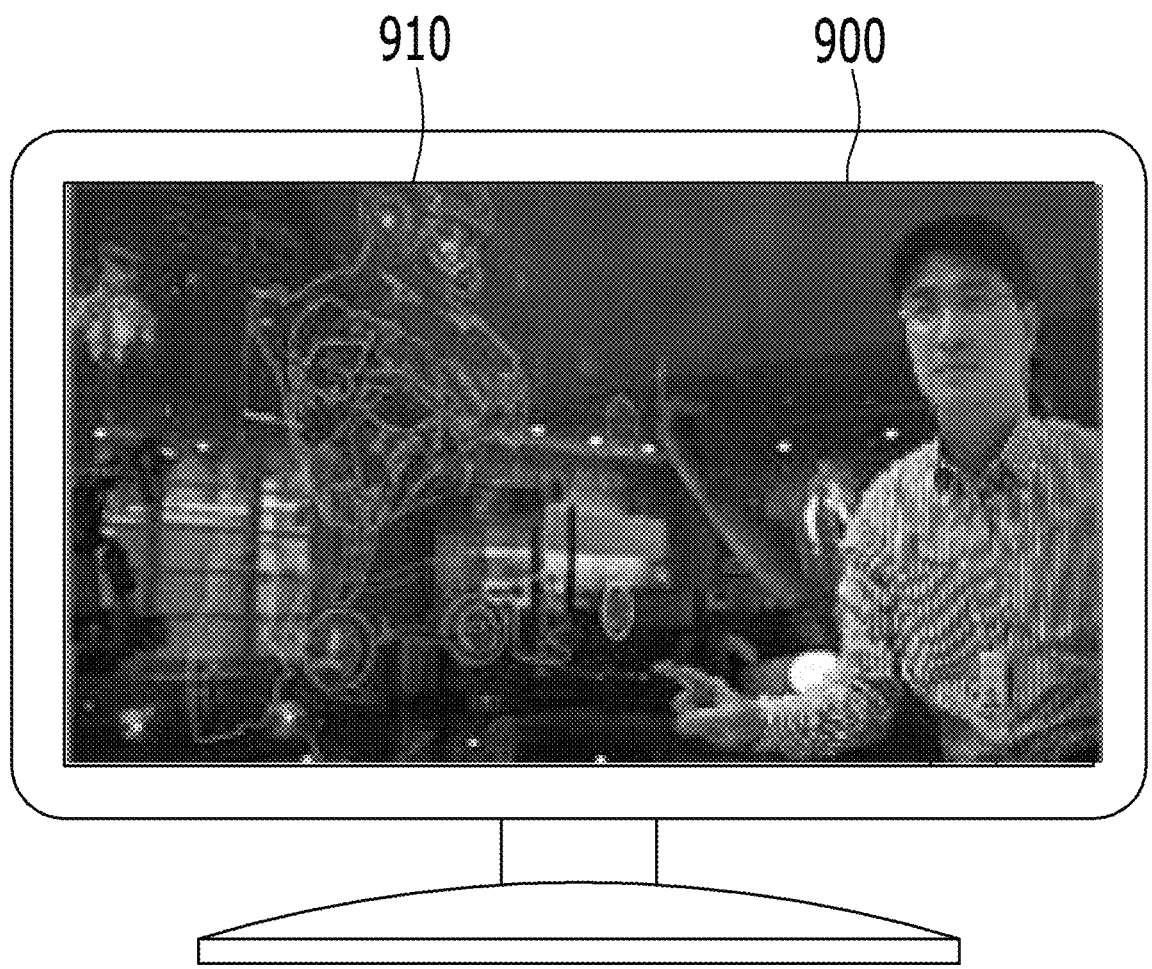
FIG. 10 is a diagram showing a multilayer augmented reality image created in accordance with at least one embodiment.

FIG. 10 is a diagram showing a multilayer augmented reality image created in accordance with at least one embodiment.

Referring to FIG. 10, AR user device 100 may overlay 3D object 910 created in a on the top most layer 900 in order to improve the augmented effect. Herein, the 3D object 910 may be displayed as a 3D wireframe form for improving 3D effect and depth of fields. Hereinafter, creating and displaying a multilayer AR image will be described in more detail. For convenience for description and ease of understanding, a multilayer AR image including five different image layers for presentation will be described as an example. For example, the multilayer AR image may include a background image layer, an object image layer, a presentation material layer, a presentation object image layer, and a 3D object image layer. However, the embodiments of the present disclosure are not limited thereto.

For convenience and ease of understanding, the embodiments of the present disclosure will be described using an example of creating a multilayer AR image for giving a presentation by a user who uses AR user device 100 linked with remote controller 710 through a wireless link.

Figure 11:
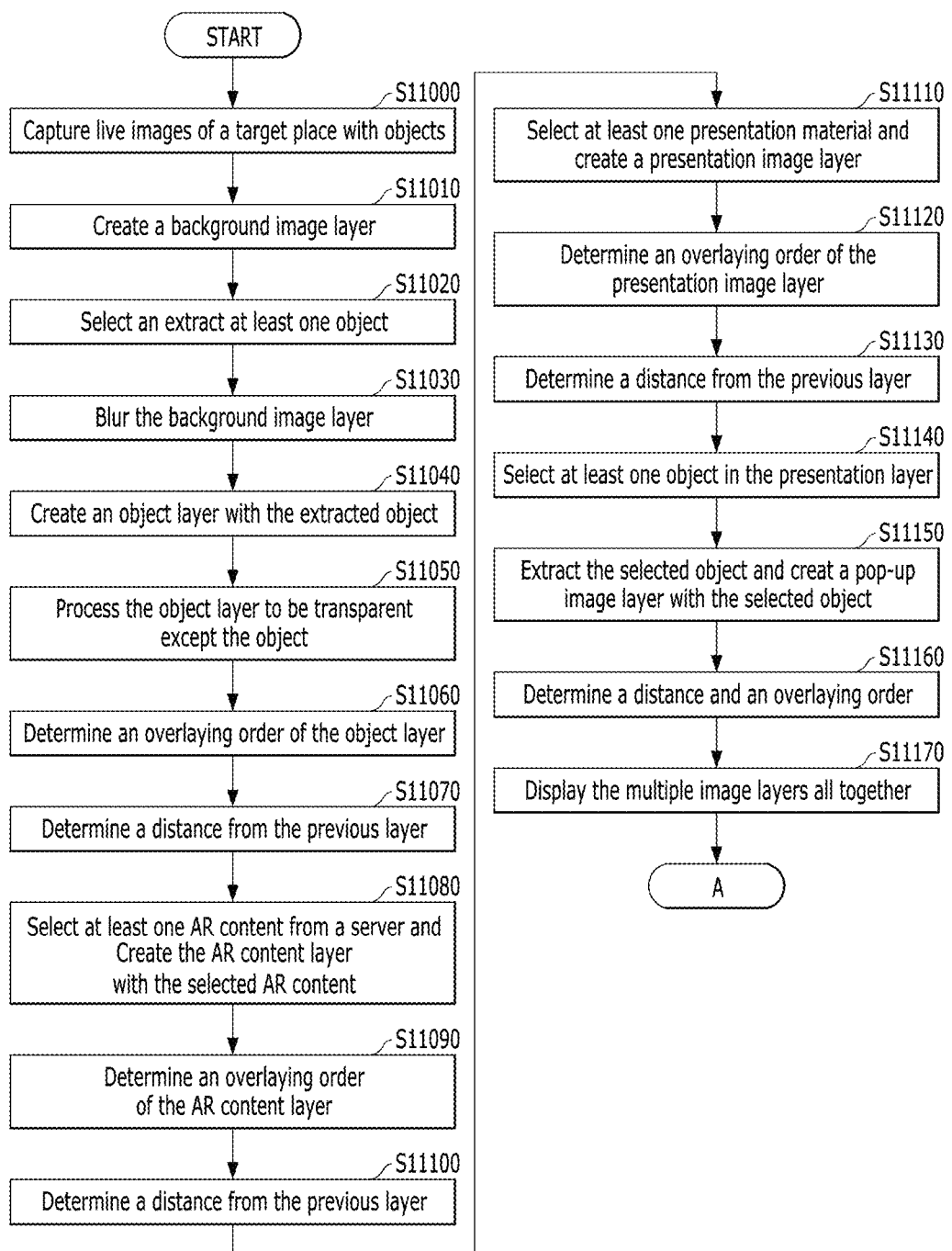
FIG. 11 is a flowchart illustrating a method for creating and displaying multilayered augmented reality image in accordance with another embodiment.

FIG. 11 is a flowchart illustrating a method for creating and displaying a multilayer AR video in accordance with at least one embodiment. Referring to FIG. 11, a target place with at least one object is captured in live using an AR device with a camera equipped at step S11000. For example, in response to a user input from remote controller 710 of presenter 700, AR user device 100 captures images of presenter 700 and surroundings in real time.

At step S11010, a background image layer may be created using the captured target place image. For example, AR user device 100 creates a background image layer with the captured target place image.

At step S11020, at least one object may be selected and extracted from the captured images. For example, AR user device 100 may display the background image layer or the captured target place image on display 410 and receive a user selection signal from the remote controller 710 of the presenter 700. Based on the user selection signal, AR user device 100 may select at least one object, such as presenter 700, from the captured target place image.

At step S11030, the background image layer may be processed to be blurred. For example, after selecting the object to be extracted, AR user device 100 processes the background image layer to be blurred in order to improve a 3D effect and depth of field of the multilayer AR image in accordance with at least one embodiment.

At step S11040, an object image layer may be created with the extracted object. For example, AR user device 100 creates an object image layer with the extracted object, such as presenter 700. At step S11050, the object image layer may be processed to be transparent except the object. For example, AR user device 100 processes the created object image layer to be transparent except presenter 700. At step S11060, an overlaying order of the object image layer may be determined. For example, AR user device 100 determines an overlaying order of the object image layer. That is, such an overlaying order may be determined as a second layer, above the background image layer, under a 3D object layer or a presentation material layer.

At step S11070, a distance to adjacent image layers may be determined. For example, AR user device 100 determines a distance between the object image layer and the background image layer. Such determination may be decided based on a user input, or a predetermined value. Such a distance may be a z value of the background image layer and a z value of the object image layer.

At step S11080, at least one AR content lay be selected from a server, and an AR content image layer may be created using the selected AR content. For example, after creating and overlaying the object image layer on the background image layer, AR user device 100 creates an AR content image layer. First, AR user device 100 may receive an input signal from remote controller 710 to select AR content from server 200. Based on the selection input, AR user device 100 retrieves the selected AR content and creates the AR content image layer with the retrieved AR content.

At step S11090, an overlaying order of the AR content image layer may be determined. At step S11100, a distance to adjacent image layers may be determined. For example, after creating the AR content image layer, AR user device 100 determine the overlaying order of the AR content image layer and a distance from adjacent image layers, such as the background image layer and the object image layer.

At step S11110, at least one presentation material may be selected, and a presentation image layer may be created with the selected at least one presentation material. For example, For example, after creating and overlaying the AR content image layer on the object image layer and the background image layer, AR user device 100 creates a presentation image layer. First, AR user device 100 may receive an input signal from remote controller 710 to select a presentation material from server 200 or stored in AR user device 100. Based on the selection input, AR user device 100 retrieves the selected presentation material and creates the presentation image layer with the retrieved presentation material.

At step S11120, an overlaying order of the presentation image layer and a distance to adjacent image layers may be determined. For example, after creating the presentation image layer, AR user device 100 determine the overlaying order of the presentation image layer and a distance from adjacent image layers, such as the AR content image layer and the object image layer.

At step S11130, at least one object in the presentation material may be selected, extracted, and a presentation object image layer may be created. For example, after creating and overlaying the presentation image layer on the AR content image layer, the object image layer, and the background image layer, AR user device 100 creates a presentation object image layer. First, AR user device 100 may receive an input signal from remote controller 710 to select at least one in the presentation image layer. Based on the selection input, AR user device 100 extract the selected presentation object, such as a predetermined sentence, from the presentation image layer and creates the presentation object image layer with the extracted object.

At step S11140, an overlaying order of the presentation object image layer may be determined, and a distance to adjacent image layers may be determined. after creating the presentation object image layer, AR user device 100 determine the overlaying order of the presentation object image layer and a distance from adjacent image layers, such as the present image layer and the AR content image layer.

At step S11150, at least one 3D content may be selected, and a 3D object image layer may be created. At step S11160, an overlaying order of the 3D object image layer, a distance to adjacent image layers, and at least one overlapped image layers may be determined. For example, after creating and overlaying the presentation object image layer on the presentation image layer, the AR content image layer, the object image layer, and the background image layer, AR user device 100 creates a 3D object image layer. First, AR user device 100 may receive an input signal from remote controller 710 to select at least one 3D object from server 200 or stored in AR user device 100. Based on the selection input, AR user device 100 retrieves the selected 3D object from server 200 of stored in AR user device 100 and creates the 3D object image layer with the retrieved 3D object. After creating the 3D object image layer, AR user device 100 determine the overlaying order of the 3D object image layer and a distance from adjacent image layers, such as the presentation image layer and the AR content image layer. For example, AR user device 100 may determine a first distance to a front adjacent image layer located in front of the 3D object image layer based on the determined overlaying order. Further, AR user device 100 may determine a second distanced to a back adjacent image layer located in back of the 3D object image layer based on the determined overlaying order. Then, AR user device 100 may overlay the 3D object image layer i) under the front adjacent image layer based on the overlaying order with the first distance separated from the front adjacent image layer and ii) on the back image layer based on the overlaying order with the second distance separated from the back adjacent image layer.

At step S11170, multiple image layers may be displayed simultaneously at a display. For example, AR user device 100 may render all the created image layers together as an AR image and display the AR image on single display 410. Alternatively, AR user device 100 may separately display multiple image layers through different displays 420-1 and 420-2, as shown in FIG. 1. Furthermore, AR user device 100 AR user device 100 may separately display multiple image layers through different transparent displays 430 in order to improve 3D effect and depth of filed and Augmented effect in accordance with at least one embodiment.

Figure 12:
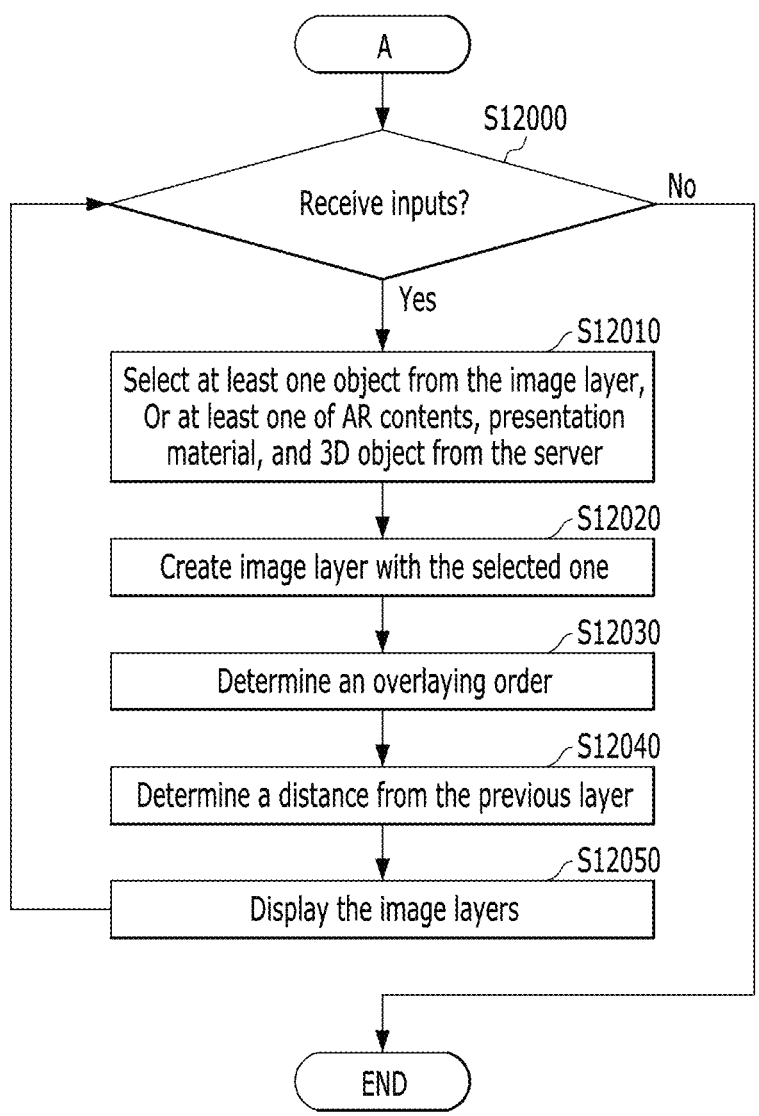
FIG. 12 is a flowchart illustrating a method for creating and displaying multilayered augmented reality image in accordance with still another embodiment

Hereinafter, a method of additionally creating and displaying multilayer AR images while displaying previous AR images in accordance with at least one embodiment. FIG. 12 is a flowchart illustrating a method for multilayered AR in accordance with still another embodiment.

Referring to FIG. 12, after multiple image layers are simultaneously displayed at the display, a user may want to create and display more image layers. In this case, a user may initiate the operation using a remote associated with AR user device 100. AR user device 100 may receive an input from the user at step S12000 while displaying previous multilayer AR images through at least one displays.

At step S12010, at least one object from one of the displayed image layers, or at least one of AR contents, presentation material, and 3D object from server 200, may be selected. For example, AR user device 100 receives a selection input from remote controller 710 to select at least one of objects in displayed image layers or stored in server 200 or in AR user device 100 while displaying the multilayer AR image layer.

At step S12020, an additional image layer may be created with the selected at least one object. For example, AR user device 100 creates the additional image layer with the selected or retrieved object. According the object, AR user device 100 may process the created additional image layer to be blur or transparent except the object.

At step S12030, an overlaying order may be determined. At step S12040, a distance to adjacent image layers may be determined. For example, AR user device 100 determines the overlaying order and the distance based on the user input or the predetermined value.

At step S12050, the created additional image layer may be displayed simultaneously with the multiple image layers according to the determined overlaying order and the determined distance. For example, AR user device 100 may render the additional object image layer with the previous AR image and display the rendering result through at least one display.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An augmented reality (AR) device for creating and displaying multiple image layers in real time, the AR device comprising:

a communication circuit configured to communicate with other devices through a communication network;

a photographing circuit configured to capture images in real time;

an image processor configured to i) create a background image layer having a target object using the captured images, ii) extract the target object and process surroundings of the target object to be transparent from the captured images to create an object image layer with the extracted target object and transparent surroundings, iii) blur the background image layer, iv) overlay the object image layer with the blurred background image layer; v) retrieve at least one AR content from at least one of a server, the AR device, and a user, and create a third image layer using the retrieved at least one AR content, and vi) create an AR image using the background image layer, the object image layer, and the third image layer wherein the third image layer includes individual parts shown to be respectively overlaid on, overlapped with, or hidden by the object image layer and the background image layer by comparing depth values of the individual parts included in the third image layer with depth value of the object image layer and the background image layer, and wherein determining a distance between two adjacent image layers, and overlaying the background image layer, the object image layer, and the third image layer to be separate at the determined distance from each other; and an input/output circuit configured to receive user input signals from a user and output the augmented reality image to at least one display.

2. The AR device of claim 1, wherein the image processor is configured to use a Gaussian filter to blur the background image layer.

3. The AR device of claim 1, wherein the image processor is configured to:
determine an overlaying order of each of the background image layer, the object image layer, and the third image layer; and
overlay the background image layer, the object image layer, and the third image layer based on the overlaying order.

4. The AR device of claim 1, wherein the distance is determined based on a size of at least one object in each image layer.

5. The AR device of claim 1, wherein the image processor is configured to:
overlay one image layer on the other image layer at a predetermined distance by changing a z value of each image layer where a z value is a depth value of a three dimensional coordinate system.

6. The AR device of claim 1, wherein the image processor is configured to:
when a first object in the third image layer is selected, create a first object image layer to show the selected first object to be popped over the third image layer by changing a z value of the first object greater than a z value of the third image layer.

7. The AR device of claim 1, wherein the image processor is configured to:
when a first color in the third image layer is selected, create a first color image layer to show an object having the selected first color to be popped over the third image layer by changing a z value of the object having the selected first color greater than a z value of the third image layer.

8. The AR device of claim 1, wherein the input/output circuit is configured to:
output at least one of the background image layer, the object image layer, and the third image layer to a first display, and output the others to a second display.

9. The AR device of claim 8, wherein the first display and the second display are a transparent display.

10. The AR device of claim 1, wherein the image processor is configured to:
select at least one of the background image layer, the object image layer, and the third image layer while displaying the augmented reality image on the at least one display; and
interrupt (or stop, end, pause) displaying the selected one.

11. The AR device of claim 1, wherein
while displaying the augmented reality image including the background image layer, the object image layer, and the third image layer on the at least one display, the image processor is configured to:
select at least one object in one of the background image layer, the object image layer, and the third image layer;
create an additional image layer with the selected at least one object;
determine an overlaying order of the additional image layer;
determine at least one of i) a first distance to a front adjacent image layer which is located in front of the additional layer based on the determined overlaying order and ii) a second distance to a back adjacent image layer which is located in back of the additional layer based on the determined overlaying order;
overlay the created additional image layer on the back adjacent image layer to be separated at the second distance and under the front adjacent image layer to be separated at the determined first distance; and
continuously display the augmented reality image by rendering the background image layer, the object image layer, the third image layer, and the additional image layer.

12. The AR device of claim 1, wherein
while displaying the augmented reality image including the background image layer, the object image layer, and the third image layer on the at least one display, the image processor is configured to:
retrieve at least one content from at least one of a server, the AR device, and a user;
create an additional image layer with the retrieved at least one object;
determine an overlaying order of the additional image layer;
determine at least one of i) a first distance to a front adjacent image layer which is located in front of the additional image layer based on the determined overlaying order and ii) a second distance to a back adjacent image layer which is located in back of the additional image layer based on the determined overlaying order;
overlay the created additional image layer on the back adjacent image layer to be separated at the determined second distance from the back adjacent image layer and under the front adjacent image layer to be separated at the determined first distance from the front adjacent image layer; and
continuously display the augmented reality image by rendering the background image layer, the object image layer, the third image layer, and the additional image layer.

13. A method for creating and displaying multiple image layers in real time, the method comprising:
- capturing images of a target object with surroundings in real time;
- creating a background image layer using the captured images of the target object with surroundings;
- extracting the target object from the captured images, process surroundings of the target object to be transparent, and create an object image layer with the extracted target object, blur the background image layer, and overlay the object image layer on the blur background image layer;
- retrieving at least one AR content from at least one of a server, the AR device, and a user, and create a third image layer using the retrieved at least one AR content;
- creating an augmented reality image using the background image layer, the object image layer, and the third image layer, wherein the third image layer includes individual parts shown to be respectively overlaid on, overlapped with, or hidden by the object image layer and the background image layer by comparing depth values of the individual parts included in the third image layer with depth value of the object image layer and the background image layer, and wherein determining a distance between two adjacent image layers, and overlaying the background image layer, the object image layer, and the third image layer to be separate at the determined distance from each other; and
- outputting the augmented reality image to at least one display.

14. The method of claim 13, comprising:
- determining an overlaying order of each of the background image layer, the object image layer, and the third image layer;
- determining a distance between two adjacent image layers; and
- overlaying the background image layer, the object image layer, and the third image layer to be separate at the determined distance from each other.

15. The method of claim 13, comprising:
- while displaying the augmented reality image including the background image layer, the object image layer, and the third image layer on the at least one display, selecting at least one object in one of the background image layer, the object image layer, and the third image layer, creating an additional image layer with the selected at least one object, determining an overlaying order of the additional image layer, determining at least one of i) a first distance to a front adjacent image layer which is located in front of the additional image layer and ii) a second distance to a back adjacent image layer which is located in back of the additional image layer, overlaying the created additional image layer on the back adjacent image layer based on the determined overlaying order and to be separated at the second distance to the back adjacent image layer and under the front adjacent image layer based on the determined overlaying order and to be separated at the first distance to the front adjacent image layer, and continuously display the augmented reality image by rendering the background image layer, the object image layer, the third image layer, and the additional image layer.

16. The method of claim 13, comprising:
while displaying the augmented reality image including the background image layer, the object image layer, and the third image layer on the at least one display, retrieving at least one content from at least one of a server, the AR device, and a user, creating an additional image layer with the retrieved at least one object, determining an overlaying order of the additional image layer, determining at least one of i) a first distance to a front adjacent image layer which is located in front of the additional image layer based on the determined overlaying order and ii) a second distance to a back adjacent image layer which is located in back of the additional image layer based on the determined overlaying order, overlaying the created additional image layer on the back adjacent image layer to be separated at the determined second distance from the back adjacent image layer and under the front adjacent image layer to be separated at the determined first distance from the front adjacent image layer, and continuously displaying the augmented reality image by rendering the background image layer, the object image layer, the third image layer, and the additional image layer, the object image layer, the third image layer, and the additional image layer.

* * * * *